(12) United States Patent
Baldemair et al.

(10) Patent No.: US 11,394,514 B2
(45) Date of Patent: Jul. 19, 2022

(54) CONTROL SIGNALING HANDLING FOR A RAN

(71) Applicant: Telefonaktiebolaget LM Ericsson (publ), Stockholm (SE)

(72) Inventors: Robert Baldemair, Solna (SE); Daniel Chen Larsson, Lund (SE); Erik Dahlman, Stockholm (SE); Sorour Falahati, Stockholm (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/609,894

(22) PCT Filed: May 5, 2017

(86) PCT No.: PCT/SE2017/050448
§ 371 (c)(1),
(2) Date: Oct. 31, 2019

(87) PCT Pub. No.: WO2018/203781
PCT Pub. Date: Nov. 8, 2018

(65) Prior Publication Data
US 2020/0204330 A1 Jun. 25, 2020

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1607* (2013.01); *H04L 1/1861* (2013.01);
(Continued)

(58) Field of Classification Search
CPC ................. H04L 5/0055; H04L 5/0053; H04L 1/1607; H04L 1/1657; H04L 1/1664;
(Continued)

(56) References Cited

U.S. PATENT DOCUMENTS

2012/0320859 A1\* 12/2012 Ahn ...................... H04L 1/1861
370/329
2016/0164657 A1\* 6/2016 Fan ....................... H04W 56/001
370/280

(Continued)

OTHER PUBLICATIONS

Author Unknown, Resource allocation for sPUCCH, pp. 1-2, Doc. No R1-1704517, Apr. 7, 2017 (Year: 2017).\*

(Continued)

*Primary Examiner* — Christopher M Crutchfield
(74) *Attorney, Agent, or Firm* — Murphy, Bilak & Homiller, PLLC

(57) ABSTRACT

The disclosure pertains to a method of operating a user equipment (10) in a radio access network. The method comprises transmitting control signaling utilising a resource sequence, the control signaling being of a control signaling type representing acknowledgement information and/or resource requesting information, wherein the resource sequence is selected from a set of resource sequences based on the control signaling type. The disclosure also pertains to related devices and methods.

26 Claims, 8 Drawing Sheets

(51) Int. Cl.
*H04W 48/08* (2009.01)
*H04W 72/04* (2009.01)
*H04W 72/12* (2009.01)
*H04L 1/16* (2006.01)

(52) U.S. Cl.
CPC ......... *H04W 48/08* (2013.01); *H04W 72/042* (2013.01); *H04W 72/0446* (2013.01); *H04W 72/1284* (2013.01)

(58) Field of Classification Search
CPC ................ H04L 1/1671; H04L 1/1861; H04L 1/1864; H04L 5/001; H04W 72/042; H04W 72/12; H04W 72/1284
See application file for complete search history.

(56) References Cited

U.S. PATENT DOCUMENTS

| | | |
|---|---|---|
| 2016/0337157 A1 | 11/2016 | Papasakellariou |
| 2017/0005769 A1 | 1/2017 | Cho et al. |
| 2017/0041103 A1 | 2/2017 | Määttanen et al. |
| 2018/0049288 A1* | 2/2018 | Rodriguez ........... H05B 47/105 |
| 2018/0294924 A1* | 10/2018 | Jeon ....................... H04W 16/14 |
| 2019/0166617 A1* | 5/2019 | Park ........................ H04L 5/001 |
| 2019/0191487 A1* | 6/2019 | Kwon ................... H04W 76/27 |

OTHER PUBLICATIONS

Author Unknown, NR-PUCCH resource determination, pp. 1-4, Doc. No. R1-1704211, Apr. 7, 2011 (Year: 2011).*
Author Unknown, Short duration PUCCH for small payload sizes, Doc. No. R1-1704206, pp. 1-6, Apr. 7, 2017 (Year: 2017).*
Author Unknown, Discussion on sPUCCH design, Doc. No. R1-1704266, pp. 1-8, Apr. 7, 2017 (Year: 2017).*
Author Unknown, Design for structure of PUCCH in short duration, Doc No. R1-1704602, Apr. 7, 2017 (Year: 2017).*
Unknown, Author, "Short PUCCH for small payload size", 3GPP TSG RAN WG1 Meeting #88bis, R1-1705553, Spokane, USA, Apr. 3-7, 2017, pp. 1-5.
Unknown, Author, "Views on sPUCCH design", 3GPP TSG RAN WG1 Meeting #88bis, R1-1705689, Spokane, USA, Apr. 3-7, 2017, pp. 1-9.

* cited by examiner

CONTROL SIGNALING HANDLING FOR A RAN

TECHNICAL FIELD

This disclosure pertains to the field of wireless communication technology, in particular for a radio access network (RAN).

BACKGROUND

Modern wireless communication technology, in particular 5G (5th Generation) technology, intends to provide high levels of flexibility and performance for communication, in particular regarding latency and data throughput. Flexibility, however, often comes at the price of signaling overhead, which might impact on performance. This is particularly relevant for control information, and especially in the context of low latency applications, in which relatively information has to be provided on short timescales. Thus, there are needed approaches of handling control information flows which on one hand provide needed information, and on the other hand do not unduly impact on system resources.

SUMMARY

The present disclosure presents approaches suitable for handling control information, which provide flexibility and limit signaling overhead. The approaches are particularly well suited for low-latency applications or applications with a high level of interactivity. Control information may be considered to be represented by control signaling.

Accordingly, there is suggested a method of operating a user equipment in a radio access network. The method comprises transmitting control signaling utilising a resource sequence, the control signaling being of a control signaling type representing acknowledgment information and/or resource requesting information, wherein the resource sequence is selected from a set of resource sequences based on the control signaling type.

There is also disclosed a user equipment for a radio access network. The user equipment is adapted for transmitting control signaling utilising a resource sequence, the control signaling being of a control signaling type representing acknowledgment information and/or resource requesting information. The resource sequence is selected from a set of resource sequences based on the control signaling type. The user equipment may comprise processing circuitry and/or radio circuitry, in particular a transmitter or transceiver, and/or may be adapted to utilise such, for transmitting and/or performing a method of operating a user equipment as described herein. Alternatively, or additionally, the user equipment may comprise a transmitting module for such transmitting.

Moreover, a method of operating a radio node in a radio access network is considered. The method comprises determining a control signaling type of received control signaling based on a resource sequence utilised for receiving the control signaling, wherein the control signaling type represents and/or comprises acknowledgment information and/or resource requesting information. The method may also comprise transmitting response signaling in response to the control signaling based on the determined control signaling type.

A radio node for a radio access network is also described. The radio node is adapted for determining a control signaling type of received control signaling based on a resource sequence utilised for receiving the control signaling, wherein the control signaling type represents acknowledgment information and/or resource requesting information. The radio node further may be adapted for transmitting response signaling in response to the control signaling based on the determined control signaling type. The radio node may comprise processing circuitry and/or radio circuitry, in particular a receiver or transceiver, and/or may be adapted to utilise such, for receiving the control signaling and/or determining the control signaling type, and/or for performing a method of operating a radio node as described herein. Alternatively, or additionally, the radio node may comprise a receiving module for such receiving, and/or a determining module for such determining. The radio node may in particular be a user equipment receiving the control signaling as sidelink signaling, or a network node receiving the control signaling as uplink signaling.

Additionally, there is proposed a method of operating a network node in a radio access network. The network node is adapted for configuring at least one user equipment with one or more sets of resource sequences, each resource sequence representing a control signaling type for control signaling, wherein the control signaling represents acknowledgment information and/or resource requesting information.

A network node for a radio access network may be considered, the network node being adapted for configuring at least one user equipment with one or more sets of resource sequences, wherein resource sequences represent a control signaling type for control signaling, wherein the control signaling type represents acknowledgment information and/or resource requesting information. The network node may comprise processing circuitry and/or radio circuitry, in particular a transmitter or transceiver, and/or may be adapted to utilise such, for configuring and/or for performing a method of operating a network node as described herein. Alternatively, or additionally, the network node may comprise a configuring module for such configuring.

These approaches allow flexible use of control signaling, with little overhead, as the control signaling type may be represented by the resource sequence utilised for transmitting it. Accordingly, less encoded information may be required for transmitting the information carried by the control signaling. It should be noted that acknowledgement information and/or resource requesting information may be considered example of control information.

Control signaling may in some variants be considered to represent, and/or comprise, and/or consist of, a specific and/or single signal or message, which may be spread out over the resource sequence utilised. It may be considered that control signaling is associated to a specific channel and/or a specific transmission. Control signaling may be according to a specific format, which may be referred to as control signaling format (which may be referred to as format in the context of this disclosure). A control signaling format may determine and/or define a length in time (duration) for the control signaling, e.g. in terms of number of symbols (respectively, symbol time lengths) or in SI time units. Alternatively, or additionally, a format may define and/or determine the information content and/or possible control signaling types of, and/or represented by, the control signaling. Control signaling may in particular comprise or be implemented as OFDMA (Orthogonal Frequency Division Multiple Access) and/or SC-FDMA (Single-Carrier Frequency Division Multiple Access) signaling.

The information content of control signaling may be carried and/or represented by the resource sequence used.

Information content may have an information size, which may be represented and/or representable by a number of bits. The information size of control signaling may be related to, and/or dependent on, its length in time, and/or its format. Specifically, the information size may be related to the resource sequences, respectively the number of elements in the set of resource sequences from which the resource sequence is selected.

Selecting a resource sequence from a set of resource sequences may be based on a mapping of the resource sequences to control information to be transmitted, e.g. such that the information to be transmitted is represented or indicated by the resource sequence.

There may be defined one or more formats for control signaling, wherein a format may determine and/or define (respectively formats may differ from each other in respect to) length in time (duration, e.g. in number of symbols), and/or information size, and/or combination of acknowledgment information and/or resource requesting information represented, and/or in control signaling types being representable and/or number of elements in an associated set of resource sequences. Alternatively, or additionally, formats may differ in respect to their location in time for transmission, e.g. predefined/fixed or configured or configurable. For example, some format/s may be predefined to be transmitted with a specific timing, e.g. at a specific symbol, e.g. in relation to a transmission timing structure, e.g. at the end of a slot. Other format/s may be configured and/or defined for transmission with a specific offset to received signaling, e.g. to the last symbol of received signaling, e.g. downlink or sidelink signaling. This may be particularly pertinent for control signaling comprising acknowledgment information.

One or more of the following formats may be considered short signaling and/or long signaling. Short signaling may pertain to signaling having a duration of 5 or less symbols, in particular one or two symbols (for conciseness, the term symbol may be used when referring to the symbol time length or duration of a symbol). Long signaling may pertain to signaling having a longer duration than short signaling, in particular having a duration of 6 or 7 or more symbols and/or covering at least one transmission timing structure (respectively, the corresponding duration), like a slot. Different short formats and/or different long formats may be considered. For example, there may be considered short formats (e.g., having the same or different durations, e.g. in number of symbols) representing different information sizes and/or different combinations of acknowledgement information and resource requesting information.

In some variants, (e.g., additional and/or redundant) information content may be encoded and/or modulated into the control signaling and/or its waveform.

Generally, a resource sequence may be mapped and/or mappable to, and/or represent, a control signaling type. A corresponding mapping may be predefined and/or configured. The mapping may be represented for example by a table and/or a function or relation, and/or may be stored in, and/or accessible by, processing circuitry, e.g. in a memory. The mapping may be used e.g. to select the resource sequence based on information content to be transmitted with the control signaling, or to determine the information content of received control signaling. In some variants, a mapping may map different information contents or control signaling types to the same resource sequence, such that e.g. one or more resource sequences of a set represent more than one (possible) contents and/or represent more than one (possible) control signaling type. In other variants, information content may be mapped uniquely (e.g., on a 1-1 basis) to resource sequences, such that for example each resource sequence in a set may represent one (e.g., exactly one) control signaling type and/or that each resource sequence represents a (in particular, exactly one) different control signaling type or content. It should be noted that both the transmitting side and the receiving side may be considered to have access to a representation of the mapping for selecting the resource sequence and determining the control signaling type, respectively.

Selecting the resource sequence may generally comprise, and/or be based on, determining the control signaling type, and/or the acknowledgement information and/or resource requesting information to be indicated and/or represented by the control signaling type. Such determining may for example include determining whether and/or how much data has to be transmitted in the context of determining resource requesting information, and/or whether a data element has been correctly received, e.g. in the context of an acknowledgement signaling process.

A set of resource sequences may comprise at least one resource sequence representing a combination of acknowledgement information and resource request information, or a corresponding control signaling type.

Specifically, it may be considered that different resource sequences in the set of resource sequences are mapped and/or mappable to, and/or represent, different control signaling types.

In general, a control signaling type may represent a specific combination of acknowledgement information and resource requesting information, and/or be represent a specific information content, e.g. specific bit values, respectively specific indications of acknowledgment signaling (e.g., ACK or NACK) and/or resource requesting signaling (e.g., request or no request). Thus, a control signaling type may be contained in a format and pertain to specific settings of possible values within the format.

A resource sequence may generally represent and/or be associated to and/or comprise one or more resources, e.g., time and/or frequency and/or code resource/s. It may be considered that a resource sequence may be represented by associated parameters, e.g. indicating for a resource sequence for example when and/or for how long in time (e.g., which subframe or slot, and/or which symbol/s), on which frequency/frequency range (e.g. which carrier and/or subcarrier/s). In particular, a resource sequence may comprise one or more resource elements, and/or may comprise and/or pertain to one or more groups of resource element groups, e.g. resource blocks. Different resource sequences, e.g. in the same set and/or in different sets, may differ in at least one of the associated time and/or frequency and/or code resource/s, in particular such that there is no overlap regarding the resource/s in which they differ. In some variants, the different resource sequences, e.g. in a set and/or in different sets, may be orthogonal and/or be based on an orthogonal distribution of resource/s. A set of resource sequences may represent, and/or be associated to the same format. Different sets of resource sequences may be associated to and/or represent different formats.

In some variants, a resource sequence may represent a control signaling type and/or a control signaling format. Control signaling of a control signaling type may be carried and/or represented by a corresponding control signaling format utilising the resource sequence.

A set of resource sequences may be considered to represent and/or may be implemented as a pool of resources or resource sequences. A set or pool may be configured e.g. via downlink control information and/or radio resource control layer signaling, e.g. DCI or RRC signaling, respectively. A resource sequence of a set, respectively the set of resource sequences, or a related superset, may be UE specific, e.g. configured by the network or network node for use by one specific UE, and/or mapped or mappable to a specific UE.

In some variants, a set of resource sequences may pertain to a specific channel for transmitting the control information, e.g. a physical channel like a physical control channel. The channel may in some variants be an uplink channel or a sidelink channel. For example, the channel may be a PUCCH (Physical Uplink Control Channel) or SCCH (Sidelink Control Channel) or similar.

In general, the set of sequences may be selected from a superset comprising a plurality of sets of sequences. Each of the sets in the superset may be associated to a different control signaling format. A set, or one or more sets of the superset, and/or the superset may be configured, e.g. to the user equipment by the network or a network node, and/or predefined. Which set to select control signaling from may be configured and/or indicated by a network node, e.g. with a corresponding set or format indicator (or in some variants with an acknowledgement resource indicator or ARI). A format indicator may in particular be useful if each set pertains to a specific format, e.g. such that each resource sequence of a specific set corresponds to the same format. Different sets in the superset may be associated to, and/or represent, different formats.

One or more resource sequences of a set may be predefined, or be configured or configurable. Different sequences of a set may be configured or configurable with different kinds of signaling, e.g. based on control signaling type. For example, resource sequences indicating and/or mappable to DTX may be configured or configurable based on RRC signaling, and resource sequences indicating ACK or NACK may be configured or configurable based on DCI signaling.

It may be considered that resource sequences, in particular each resource sequence, in a set of sequences represent and/or indicate different combinations of acknowledgment information and/or resource requesting information.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Examples of a transmission timing structure are subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot. A transmission timing structure may cover a time interval of a specific length, which may be dependent on symbol time length and/or cyclic prefix used. A transmission timing structure may pertain to and/or cover a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology.

Control information may generally be considered to represent acknowledgement information and/or resource request information. The control information (respectively, its content) may be represented and/or indicated by the resource sequence utilised for transmission.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgement information may pertain to one acknowledgement signaling process, or two or more acknowledgement signaling processes. It may be considered that to each acknowledgment signaling process the acknowledgement information pertains to, a specific number of bits of the information size of the control signaling is assigned.

Resource requesting information may indicate whether resource/s for transmission are requested, and/or represent a request for resources. Resource requesting information may represent one or more bits, which may be indicative of resource being requested or not for an associated resource requesting process. Resource requesting information may pertain to one or more resource requesting processes. It may be considered that to each resource requesting process a specific number of bits of the information size of the control signaling format is assigned. Resource requesting information may represent one (or more) bit or information switch to indicate that resources are requested, e.g. based on a transmission buffer fill level and/or priority of transmission. An indication of amount of resources requested may be transmitted separately, or be encoded in the control signaling, or may be implicit, e.g. based on a configuration, which may be known to both the network/network node and UE, or at least to one of these.

An information switch in this context may be seen as an indication of one possible state of control information or a related bit or bit pattern (e.g., acknowledgment information or resource requesting information), e.g. a specific bit setting. To represent the other possible state/s, other resource sequence/s would have to be used for transmission, such that a resource sequence may be mapped to a specific bit pattern (or several possible bit patterns, which may be overlayed). A bit pattern may general represent one or more bits, with specific bits set or unset (0 or 1, or equivalent according to convention).

Overlaying information (e.g., bit patterns) on resource sequences may be considered to include mapping more than one possible bit pattern to the same resource sequence, such that for this resource sequence the mapping is ambiguous. This may be particularly useful for mapping information pertaining to different resource requesting processes to the same resource sequence, indicating generally that resources are requested (or not). Alternatively, or additionally, NACK and DTX information may be overlayed, in particular depending on number of retransmissions. More alternatively, or additionally, with acknowledgement information pertaining to two or more acknowledgement signaling processes may be overlayed, for example such that one NACK is indicated by the signaling if any of the processes indicates NACK, or one ACK is indicated by signaling if all processes indicate ACK. Instead of overlaying this may also be referred to as signal overloading, and may generally pertain to providing or indicating one information or signaling or bit value for two or more processes, such that the individual information for each process is not transmitted. With overlaying/overloading, fewer resource sequences are used/reserved/configured for control signaling, allowing more efficient communication. Moreover, the orthogonality/distinctiveness of different control signaling types is improved. This may in particular be relevant for a network servicing a large number of user equipments.

Response signaling may for example comprise scheduling information (e.g., a scheduling grant), and/or data retransmission or new data transmission based on received control signaling.

The control signaling may be transmitted in a mini-slot, and/or the control signaling may have a short format, e.g. have a length in time of less than 5 symbol time lengths, in particular of 3, 2 or 1 symbol time lengths. In some variants, the control signaling may be transmitted in response to received signaling, wherein the received signaling may be received in the same transmission timing structure, e.g. the same slot, in which the control signaling is transmitted. This may in particular occur for cases in which the control signaling or its format has a length in time of 2 or 1 symbol time lengths. Such a variant is particularly suitable for low latency applications, allowing quick transmission of control signaling, e.g. for improved scheduled or very fast acknowledgement signaling.

There is also disclosed a program product comprising instructions causing processing circuitry to control and/or perform any method described herein.

Moreover, a carrier medium arrangement is proposed, the carrier medium arrangement carrying and/or storing a program product as disclosed herein.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
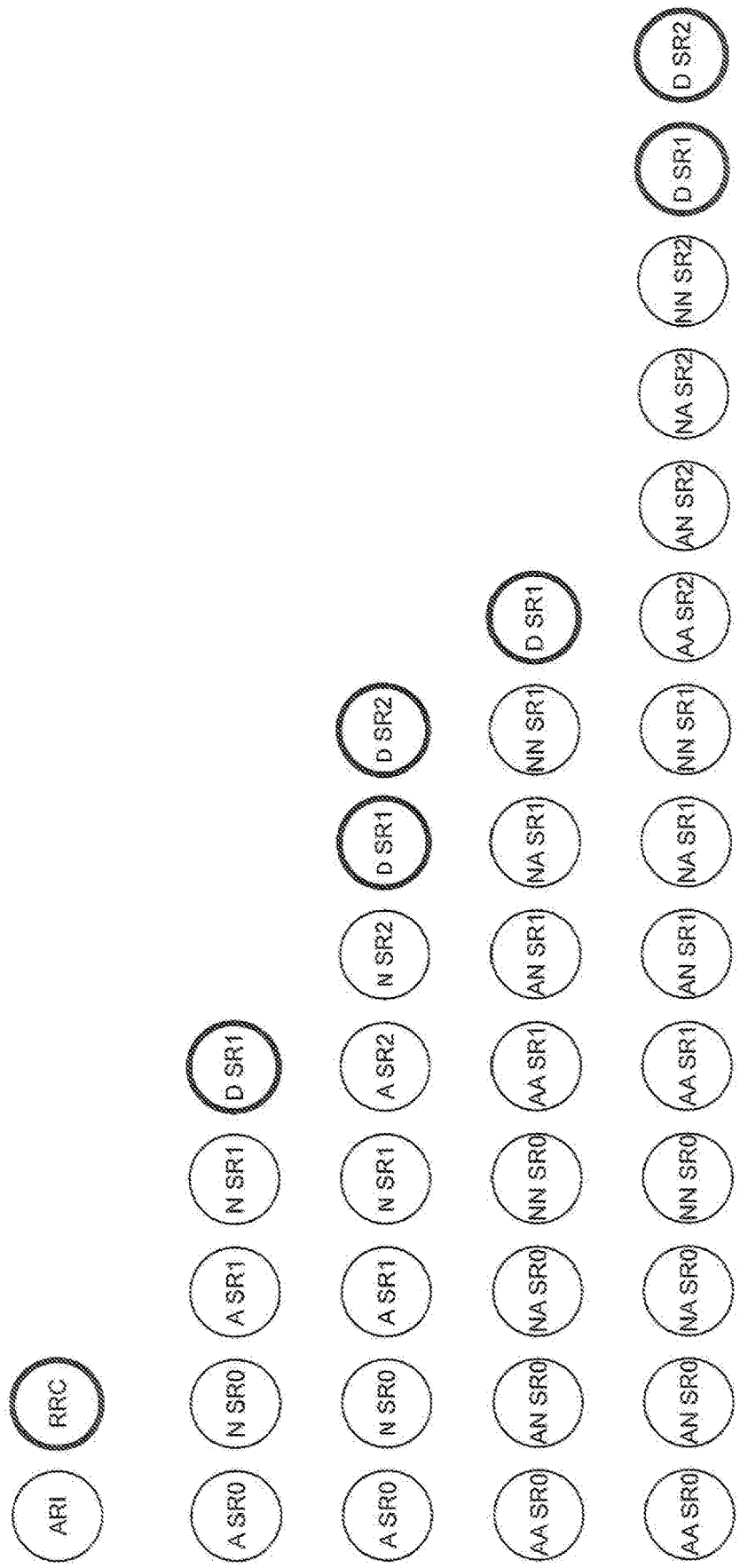
FIG. 1, showing examples of sets of resource sequences.

In the following, exemplary sets of resource sequences, which may be combined to a superset, are described.

In FIGS. 1 to 6, resource sequences are indicated as circles, with corresponding control signaling types indicated inside the circles. For the control signaling types, A indicates ACK, N indicates NACK, AA indicated two ACKs (e.g., for two different acknowledgement signaling process like two HARQ processes, or for layered/differentiated or redundant acknowledgement signaling), NN two NACKs, AN/NA a combination of ACK and NACK, and so on. D represents DTX (e.g., no transmission expected or scheduled).

SR generally pertains to a scheduling request, which represents resource requesting information. SR1 pertains to a first scheduling request, for example for a first resource requesting or scheduling process. SR2 pertains to a second scheduling request, for example for a second resource requesting or scheduling process. SR0 indicates no resource requesting information being transmitted. The scheduling processes may pertain to different data streams and/or channels and/or different levels of priority. It may be noted that when scheduling or when determining whether a request is to be transmitted, the processes may be combined or treated separately, but for signaling purposes they may be treated separately if indicated as SR1 or SR2. SR may, in cases in which a set of resource sequences otherwise includes a resource sequence explicitly indicating SR1 and/or SR2, indicate either or a combination of both, e.g. based on a concatenation (e.g., with logical AND or OR) of information representing SR1 and SR2. This may be referred to as SR bundling. An indication of SR, SR1 or SR2 indicates that resources are requested for the corresponding resource requesting process. Such a request may represent the corresponding resource requesting information.

In the top line of FIGS. 1 to 6, ARI indicates that the resource sequence may be addressed and/or configured e.g. by downlink control information, e.g. DCI. RRC indicates that the corresponding resource sequence may be addressed and/or configured e.g. by RRC signaling. This is indicated in the lines below the top line by the width of the circle circumference corresponding to the ARI or RRC circles.

Each of the lines below the top lines in FIGS. 1 to 6 represents a set of resource sequences, with specific format/s associated. All the sets of one figure may be considered to represent a possible superset. It should be noted that the circles with thicker lines (which may be RRC configured) are considered optional or the examples for each set and may be omitted. Sets may be used individually or in any combination within a superset.

The first set in each of FIGS. 1 to 6 correspond to a format and control signaling types representing or pertaining to one acknowledgement signaling process, in particular A or N, and at most one resource requesting process (indicated SR1, considering SR0 indicates no SR to be indicated). The second set pertains to a format and control signaling types representing one acknowledgement signaling process and two possible resource requesting processes. The third set pertains to a format and control signaling types representing two acknowledgement signaling processes and at most one resource requesting process. The last set corresponds to a format and control signaling types representing two acknowledgement signaling processes and two possible resource requesting processes. The resource sequences in FIGS. 1 to 6 may in particular pertain to short signaling, for example with a 1 symbol duration. Crossed out circles may be considered to not be in the set and are indicated for comparison. Generally, the sets may include additional elements/resource sequences, for example for indicating SR1 and SR2, in combination with acknowledgment information (e.g., A or N or AA, AN, NN, NA, etc.) or without.

Figure 2:
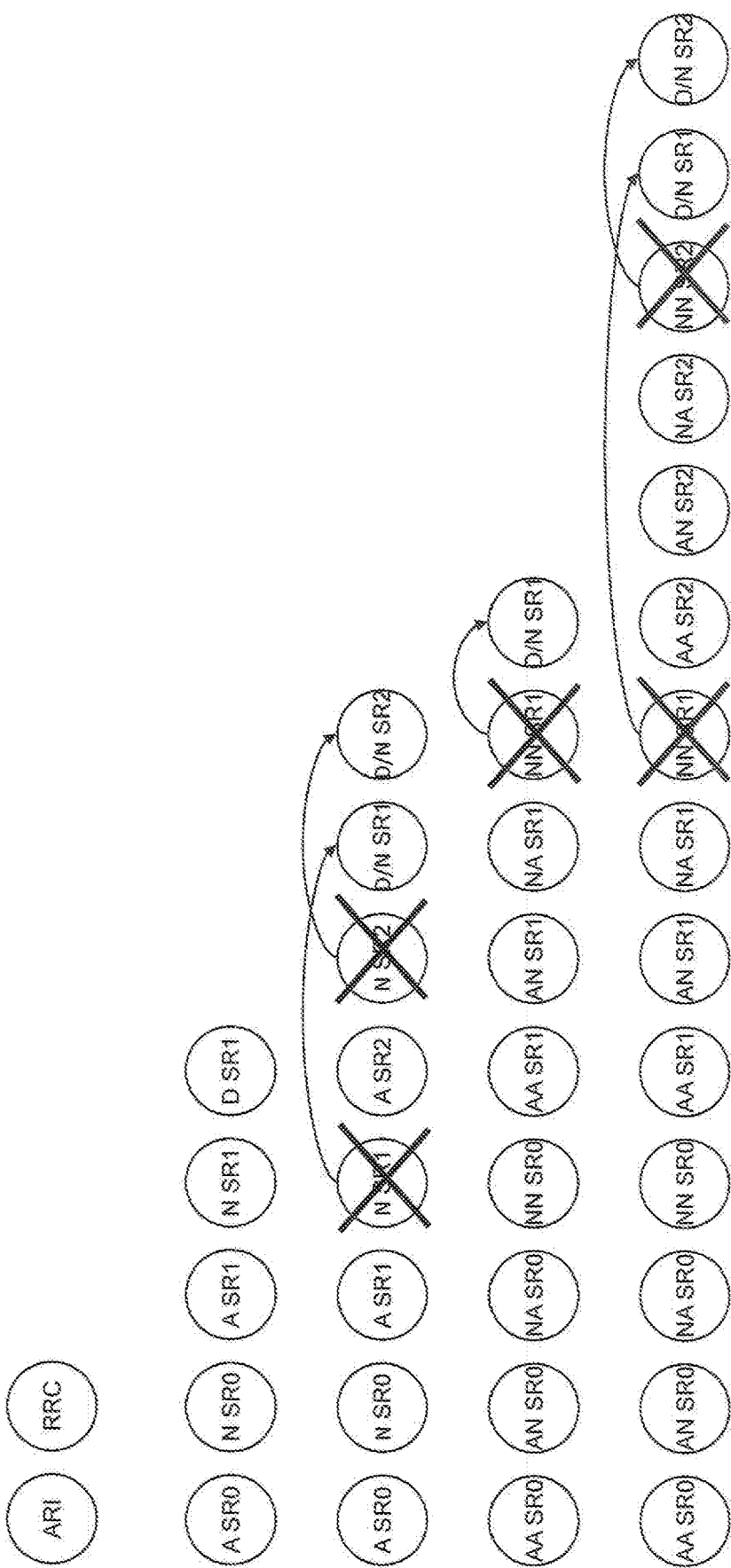
FIG. 2, showing different examples of sets of resource sequences.
Figure 3:
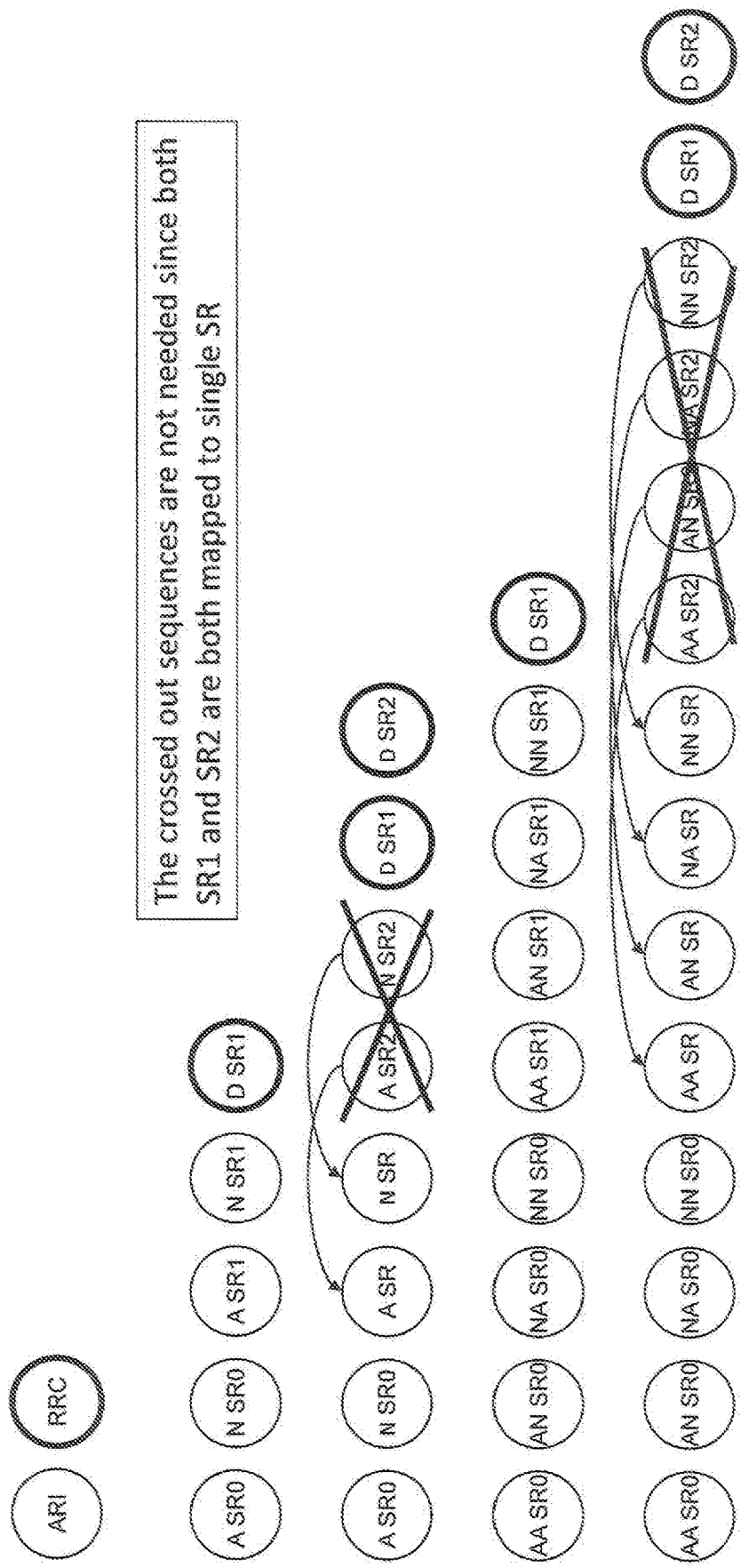
FIG. 3, showing yet more different examples of sets of resource sequences.
Figure 4:
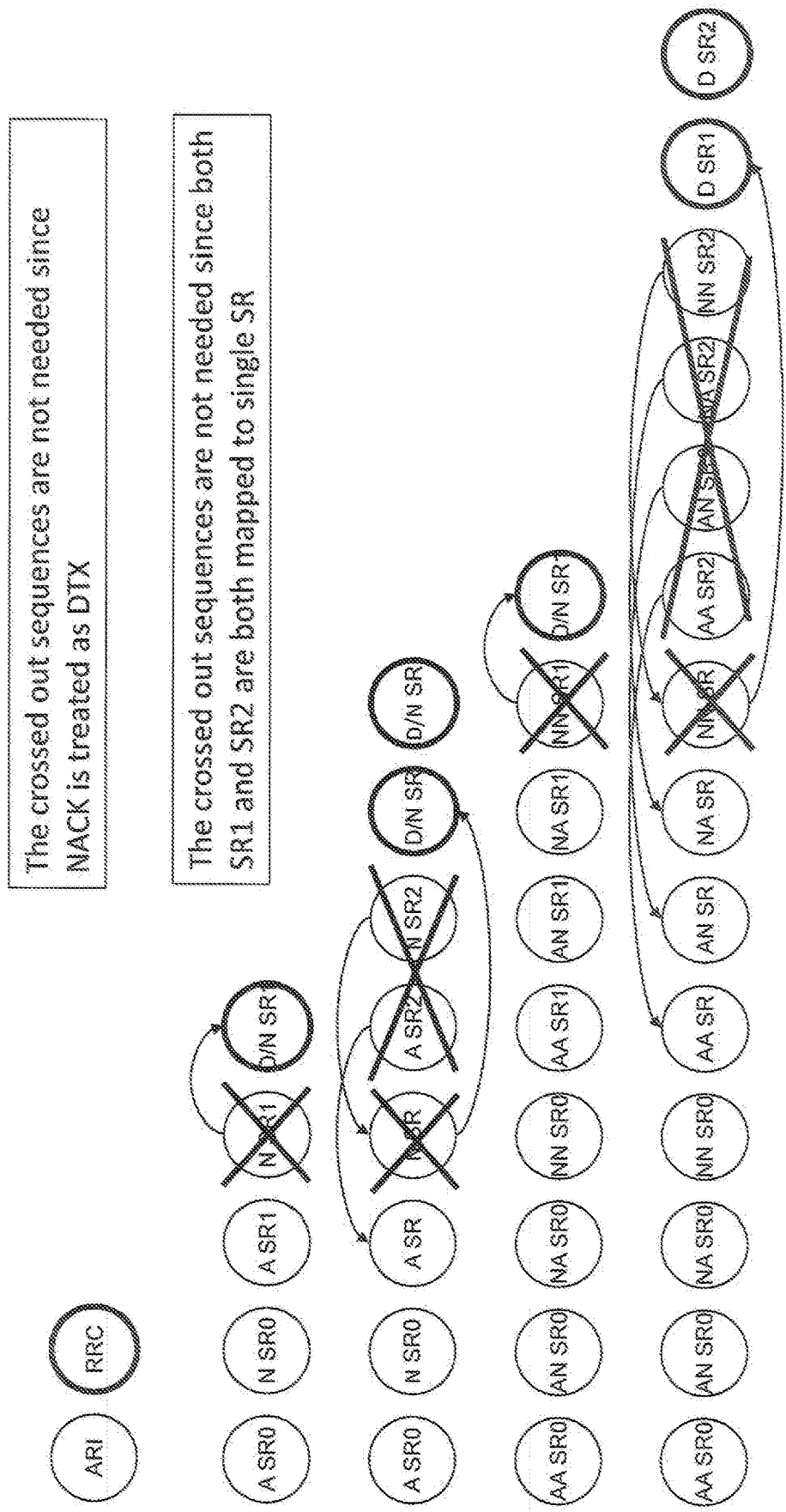
FIG. 4, showing yet more different examples of sets of resource sequences.
Figure 5:
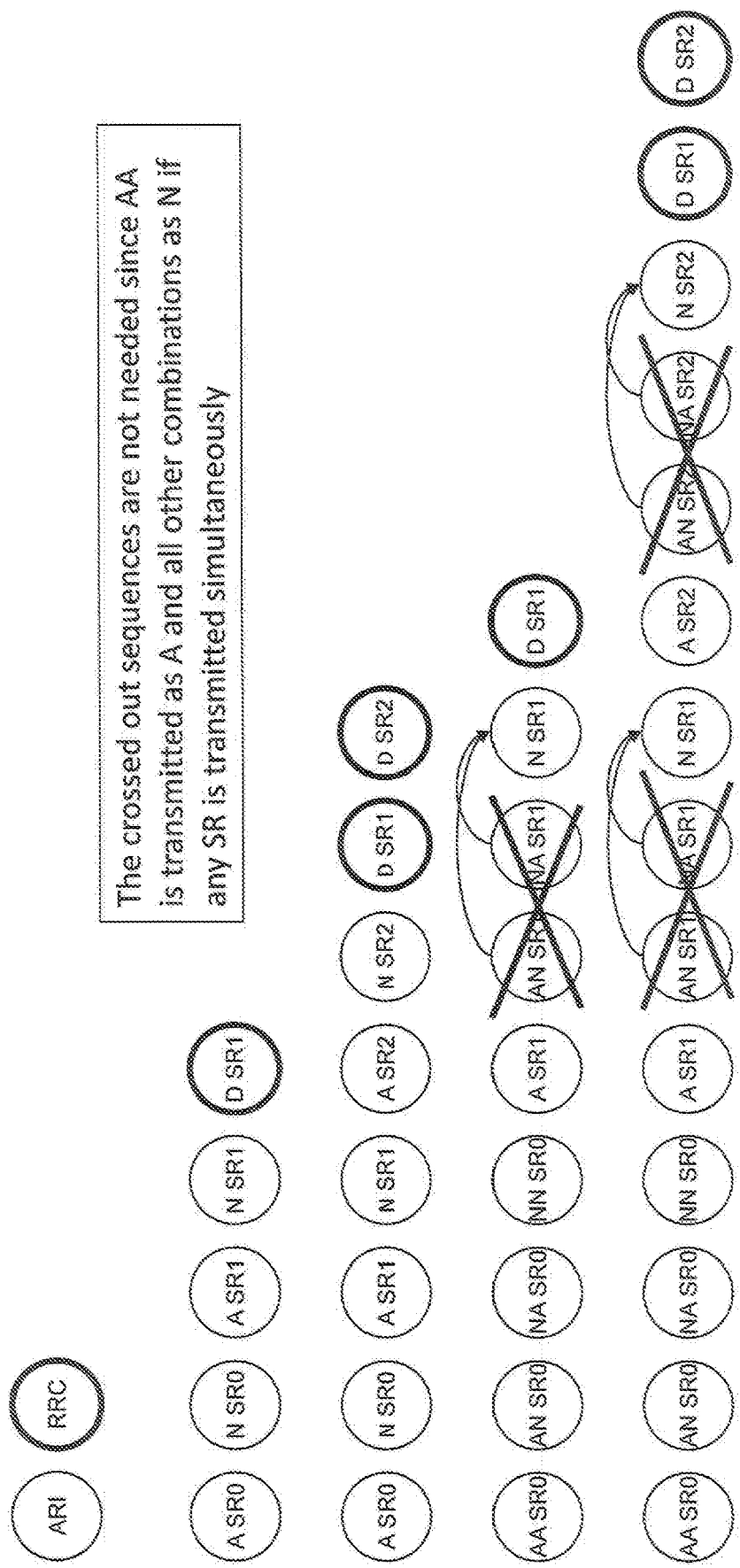
FIG. 5, showing yet more different examples of sets of resource sequences.
Figure 6:
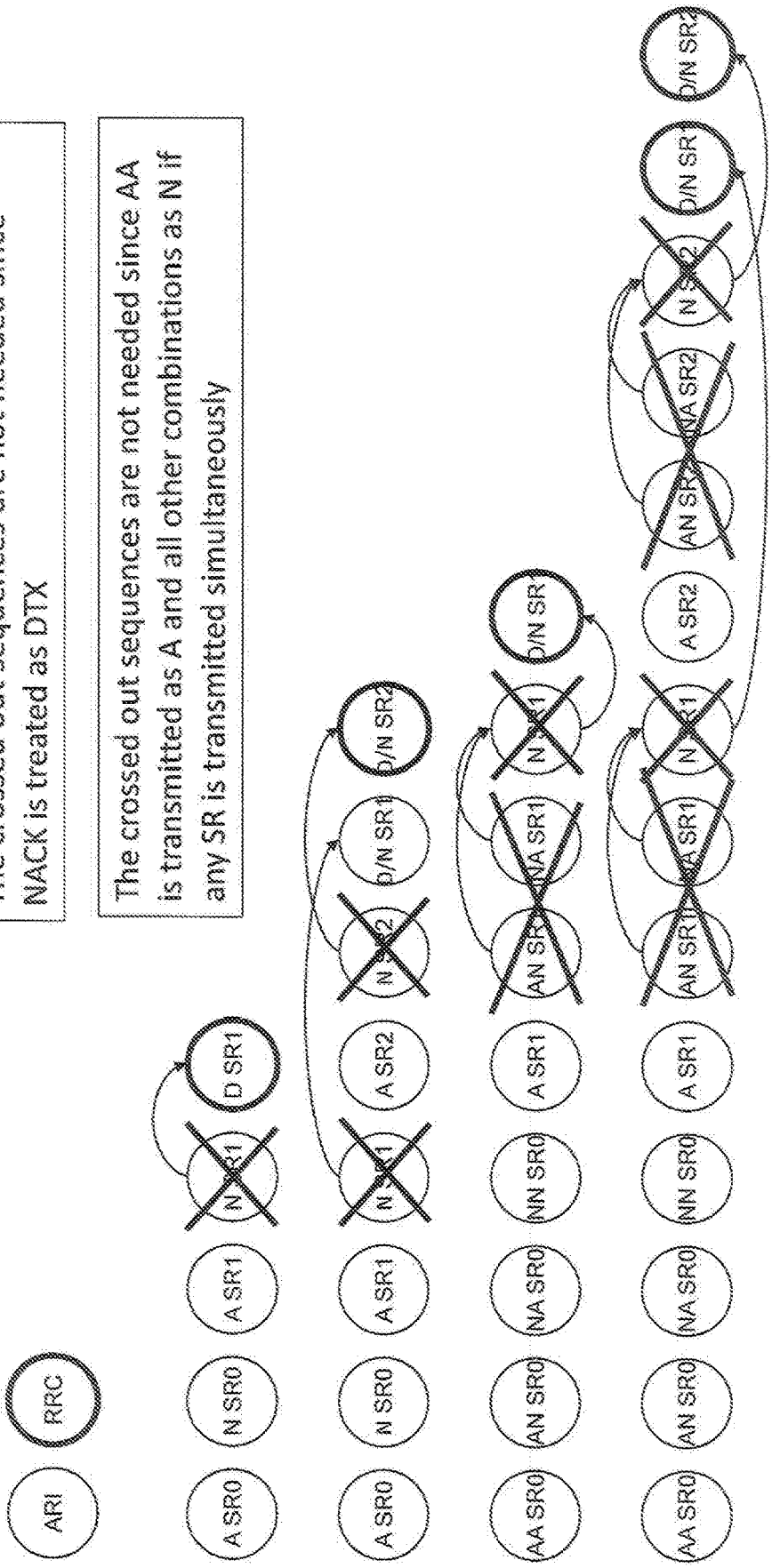
FIG. 6, showing yet more different examples of sets of resource sequences.

FIG. 1 shows sets without overlaying. In FIG. 2 a variant is shown in which NACK information in combination with a resource request are overlayed with DTX with a corresponding resource request. As shown, for the first set this overlay is not performed. However, in some variants it may be considered to also overlay NACK with DTX for the first set. It should be noted that overlaying of NACK and DTX may not be suitable in variants not considering DTX. In FIG. 3, a variant is shown in which a resource requests for either resource requesting process combined with at least one ACK or NACK are overlayed to a corresponding ACK/NACK with bundled SR. FIG. 4 shows a variant corresponding to a combination of the variants of FIGS. 2 and 3. FIG. 5 shows a variant in which acknowledgment information pertaining to different acknowledgement information processes is overlayed, exemplarily such that a single NACK is indicated if any of the acknowledgement signaling processes indicated NACK for any combination including a resource request. AA may be interpreted as A. FIG. 6 shows a further variant represent a combination of the variants shown in FIGS. 2 and 5, in which however NACK is overlayed on DTX for the first set as well, which is optional.

From FIGS. 2 to 6 it may be seen how overlaying may reduce the number of elements in each set, freeing resources. The different variants may be combined freely. It should be noted that overlaying as described herein illustrates approaches and the reasoning behind determining and/or interpreting elements of the different sets and supersets, but not necessarily steps to be performed when selecting which set or which resource sequence to utilize for control signaling. Rather, based on the overlaying (or lack of overlaying), the mapping of control information to resource sequences in the different sets is illustrated. Sets (or supersets) as illustrated may be configured to a user equipment, and/or a user equipment may select resource sequences from such set/s for transmitting control signaling.

Figure 7:
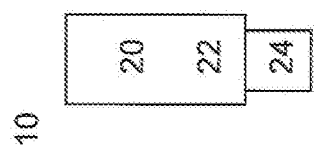
FIG. 7, showing an exemplary radio node like a user equipment or terminal.

FIG. 7 schematically shows a radio node or terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a transmitting module or receiving module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein. Radio node 10 may generally be adapted to carry out any of the methods of operating a radio node like terminal or UE disclosed herein; in particular, it may comprise corresponding circuitry, e.g. processing circuitry, and/or modules.

Figure 8:
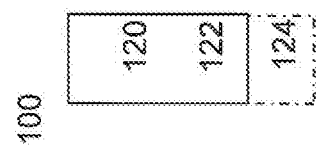
FIG. 8, showing an exemplary radio node like a network node.

FIG. 8 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna 124 circuitry may be connected to and/or comprise an antenna array. The node 100, respectively its circuitry, may be adapted to perform any of the methods of operating a network node or a radio node as described herein, in particular for determining a control signaling type and/or for configuring a user equipment.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication, may comprise signaling and/or a plurality of signals and/or messages and/or may be comprised therein, which may be transmitted on different carriers and/or be associated to different acknowledgement signaling processes, e.g. representing and/or pertaining to one or more such processes.

Different formats of for control information may be considered, e.g. different formats for a control channel like a Physical Uplink Control Channel (PUCCH). PUCCH may carry control information or corresponding control signaling, e.g. Uplink Control Information (UCI), which may comprise acknowledgement signaling like HARQ feedback (ACK/NACK), and/or Channel Quality Information (CQI), and/or Scheduling Request (SR). One of the supported PUCCH formats is short, and may e.g. occur at the end of a slot interval. Similar control information may be provided on a sidelink, e.g. as Sidelink Control Information (SCI), in particular on a (physical) sidelink control channel, like a (P)SCCH.

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent and end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries.

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node. Transmitting in sidelink may pertain to (direct) transmission from on terminal to another. Uplink, downlink and sidelink (e.g., sidelink transmission and reception) may be considered communication directions.

Signaling may generally comprise one or more signals and/or one or more symbols. Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/ allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/ or a HARQ-specific channel. Multiple channels may apply for multi-component/multi-carrier indication or signaling.

An acknowledgement signaling process may be a process of transmitting and/or retransmitting data (e.g., in the form of data elements), based on acknowledgement signaling, e.g. acknowledgement feedback like HARQ or ARQ feedback. Acknowledgement signaling may comprise and/or represent acknowledgement information, which may represent an acknowledgment or non-acknowledgement, e.g. of correct reception of the corresponding data or data element, and optionally may represent an indication of non-reception. In particular, acknowledgment information may represent ARQ (Automatic Repeat request) and/or HARQ (Hybrid Automatic Repeat reQuest) feedback. Correct reception may include correct decoding/demodulation, e.g. according to an ARQ or HARQ process, for example based on error detection and/or forward error correction coding, which may be based on a data element being received. Correspondingly, incorrect reception (non-acknowledgement) may refer to detection of an error during decoding/demodulating. Non-reception may indicate non-reception of a data element and/or non-reception of an acknowledgement position indication indicating a mapping pertaining to the data element. Non-reception may for example be indicated by a DTX (Discontinuous Transmission) indication. It should be noted that there may be DTX on either side of a communication. The radio node determining and/or transmitting the acknowledgement signaling may not receive an expected data element, and indicate this in the acknowledgement signaling as DTX, allowing more finely grained acknowledgment information. On the other hand, the radio node receiving acknowledgment signaling may not receive an expected acknowledgement signal, and treat this as a DTX event. Both kinds of DTX may be treated separately, e.g. as DTX1 and DTX2 or according to a different scheme. A data element in the context of acknowledgement signaling may in particular represent a data block like a transport block or code block, which may be subject to an acknowledgement signaling process, and one or more transmissions in the context of such a process.

A scheduling process (also referred to as resource requesting process) may be a process associated to scheduling resources, which in particular may be performed in a network node based on resource requesting information. Different scheduling processes may be operated separately, e.g. in parallel, e.g. pertaining to different terminals and/or data streams and/or radio bearers and/or priority levels. From a UE perspective, different scheduling processes, or requesting processes, may pertain to different data streams and/or channels (e.g., one or more control channels and one or more shared channels) and/or buffers, which for example may store/buffer information or data for transmission. A resource requesting process may request resources e.g., by transmitting resource requesting information. This may be triggered e.g. based on fill state of one or more buffers, and/or on detecting the presence of data to be transmitted, and/or based on an associated priority.

Control signaling may in particular be signaling on an uplink control channel, in particular PUCCH, or alternative on an uplink shared channel like PUSCH. However, in some variant acknowledgement signaling may be signaling on a sidelink and/or sidelink control channel.

Transmitting signaling like control signaling utilising a resource sequence may be considered to comprise transmitting the signaling such that it is transmitted on the resources represented by and/or associated to the resource sequence.

Transmitting signaling, in particular control signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation.

Transmitting control signaling or acknowledgement signaling may be based on, and/or comprise, determining acknowledgement information, e.g. pertaining to one or more data elements or data streams. Determining such information may comprise performing an ARQ and/or HARQ process and/or determining correct reception of the data elements (and/or considering non-reception). Alternatively, or additionally, transmitting acknowledgement signaling may comprise and/or be based on receiving the data, respectively data elements, for example based on a configuration, which may be a downlink data configuration. Such a configuration may be configured by a network node. The configuration may (statically and/or dynamically, e.g. in part both) be valid for one, or more than one, time structure or TTI. However, in some cases, the configuration may be dynamically adapted for each time structure or TTI, e.g. as configured by a network node. Different acknowledgement signaling processes may be identified by different process labels or identifiers, e.g. HARQ process identifiers or sub-process identifiers.

Acknowledgement signaling may be considered pertaining to downlink data if it comprises acknowledgement information pertaining to downlink data respectively the data element/s thereof. Downlink data may generally represent data transmitted on a downlink channel, e.g. subject to one or more ARQ or HARQ processes. A data element may in particular represent a (e.g., a single) data block (like a transport block), which may be associated to a specific ARQ/HARQ process. In particular, different data streams, respectively their data element/s, may be associated to different ARQ/HARQ processes (which may run in parallel).

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type. Acknowledgement signaling may comprise and/or represent one or more bits (e.g., for ACK/NACK) for an acknowledgement signaling process, and/or comprise additional information, e.g. indicating that a data element was not received and/or scheduled (DTX).

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers.

Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of or associated to a symbol. Accordingly, different symbols may have different symbol time lengths.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Acknowledgement information may generally be represented by acknowledgment signaling, resource requesting information analogously by resource requesting signaling. Both kinds of signaling may be considered examples or parts of control signaling. Acknowledgment information may pertain to one or more acknowledgement signaling processes, which may be independent of each other. Resource requesting information may pertain to one or more resource requesting processes (or scheduling processes), which may be independent of each other. Information for independent processes may be signaled to represent to individual processes, or may be overlayed/overloaded. Overloading resource requesting information may be considered an example of bundling scheduling information. It should be noted that a resource requesting process may be operated in a user equipment (UE) independently of a corresponding scheduling process in a network node, in particular in the sense that the resource requesting process may determine corresponding information, respectively whether to transmit such information, without input/signaling from the network node, based on information available to the user equipment.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some Useful Abbreviations Comprise

| Abbreviation | Explanation |
| --- | --- |
| ACK | Acknowledgment |
| ARI | ACK/NACK Resource Indicator |

-continued

| Abbreviation | Explanation |
|---|---|
| CCE | Control Channel Element |
| DCI | Downlink Control Information |
| DL | Downlink |
| DTX | Discontinued Transmission |
| HARQ | Hybrid Automatic Repeat Request |
| MIMO | Multiple Input Multiple Output |
| NACK | Negative Acknowledgment |
| OFDM | Orthogonal Frequency Division Multiplexing |
| PAPR | Peak to Average Power Ratio |
| PDCCH | Physical Downlink Control Channel |
| PUCCH | Physical Uplink Control Channel |
| RE | Resource Element |
| RB | Resource Block |
| RBG | Resource Block Group |
| RRC | Radio Resource Control |
| SC-FDM | Single-Carrier Frequency Division Multiplexing |
| SL | Sidelink |
| UE | User Equipment |
| UL | Uplink |

The invention claimed is:

1. A method performed by a user equipment in a radio access network, the method comprising:
transmitting control signaling utilizing a resource sequence, the control signaling representing acknowledgement information or a combination of acknowledgement information and resource requesting information, wherein the resource sequence is selected from a set of resource sequences based on the specific information to be conveyed by the control signaling, the selected resource sequence from the set conveying multiple bits of the specific information.

2. The method of claim 1, wherein a resource sequence is mapped to an information content of the control signaling.

3. The method of claim 1, wherein different resource sequences in the set of resource sequences are mapped to different information contents of the control signaling.

4. The method of claim 1, wherein a resource sequence comprises time and/or frequency and/or code resource/s.

5. The method of claim 1, wherein the set of sequences is selected from a superset comprising a plurality of sets of sequences.

6. The method of claim 1, wherein different resource sequences in a set of sequences represent different combinations of acknowledgement information and/or resource requesting information.

7. The method of claim 1, wherein acknowledgement information indicates acknowledgement or non-acknowledgement or non-reception, and/or resource requesting information indicates whether resources for transmission are requested.

8. The method of claim 1, wherein the control signaling is transmitted in a mini-slot, and/or the control signaling has a length in time of 3 symbol time lengths or less.

9. A user equipment for a radio access network, the user equipment comprising:
radio circuitry; and
processing circuitry connected to the radio circuitry, the processing circuitry being configured to use the radio circuitry to transmit control signaling utilizing a resource sequence, the control signaling representing acknowledgement information or a combination of acknowledgement information and resource requesting information, wherein the resource sequence is selected from a set of resource sequences based on the specific information to be conveyed by the control signaling, the selected resource sequence from the set conveying multiple bits of the specific information.

10. The user equipment of claim 9, wherein a resource sequence is mapped to an information content of the control signaling.

11. The user equipment of claim 9, wherein different resource sequences in the set of resource sequences are mapped to different information contents of the control signaling.

12. The user equipment of claim 9, wherein a resource sequence comprises time and/or frequency and/or code resource/s.

13. The user equipment of claim 9, wherein the set of sequences is selected from a superset comprising a plurality of sets of sequences.

14. The user equipment of claim 9, wherein different resource sequences in a set of sequences represent different combinations of acknowledgement information and/or resource requesting information.

15. A method of operating a radio node in a radio access network, the method comprising:
determining specific information conveyed by control signaling, based on a resource sequence utilized for receiving the control signaling, wherein the control signaling represents acknowledgement information or a combination of acknowledgement information and resource requesting information, and wherein determining the specific information comprises determining multiple bits of the specific information based on which resource sequence was utilized for receiving the control signaling.

16. The method of claim 15, wherein a resource sequence is mapped to an information content of the control signaling.

17. The method of claim 15, wherein different resource sequences in the set of resource sequences are mapped to different information contents of the control signaling.

18. The method of claim 15, wherein a resource sequence comprises time and/or frequency and/or code resource/s.

19. The method of claim 15, wherein the set of sequences is selected from a superset comprising a plurality of sets of sequences.

20. The method of claim 15, wherein different resource sequences in a set of sequences represent different combinations of acknowledgement information and/or resource requesting information.

21. The method of claim 15, wherein the control signaling is transmitted in a mini-slot, and/or the control signaling has a length in time of three symbol time lengths or less.

22. A radio node for a radio access network, the radio node comprising:
radio circuitry; and
processing circuitry connected to the radio circuitry, the processing circuitry being configured to determine specific information conveyed by control signaling, based on a resource sequence utilized for receiving the control signaling, wherein the control signaling represents acknowledgement information or a combination of acknowledgement information and resource requesting information, and wherein the processing circuitry is configured to determine multiple bits of the specific information based on which resource sequence was utilized for receiving the control signaling.

23. The method of claim 1, wherein the resource sequences in the set are mapped to specific information conveyed by control signaling such that an acknowledgement for a given acknowledgement signaling process maps to a different sequence or to different sequences than a negative acknowledgement for the given acknowledgement process.

24. The user equipment of claim 9, wherein the resource sequences in the set are mapped to specific information conveyed by control signaling such that an acknowledgement for a given acknowledgement signaling process maps to a different sequence or to different sequences than a negative acknowledgement for the given acknowledgement process.

25. The method of claim 1, wherein multiple resource sequences in the set each comprise multiple resources.

26. The user equipment of claim 9, wherein multiple resource sequences in the set each comprise multiple resources.

* * * * *